United States Patent
Kim et al.

(10) Patent No.: US 9,563,409 B2
(45) Date of Patent: Feb. 7, 2017

(54) SYSTEMS AND METHODS FOR MANAGING DUPLICATION OF OPERATIONS

(71) Applicant: XEROX CORPORATION, Norwalk, CT (US)

(72) Inventors: Hyun Joo Kim, Monmouth Junction, NJ (US); Andres Quiroz Hernandez, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 220 days.

(21) Appl. No.: 13/668,772

(22) Filed: Nov. 5, 2012

(65) Prior Publication Data

US 2014/0129575 A1   May 8, 2014

(51) Int. Cl.
*G06F 7/00* (2006.01)
*G06F 17/30* (2006.01)
*G06F 9/44* (2006.01)

(52) U.S. Cl.
CPC ........... *G06F 8/36* (2013.01); *G06F 17/30693* (2013.01)

(58) Field of Classification Search
CPC .............. G06F 17/30097; G06F 17/301; G06F 17/30103; G06F 17/3012; G06F 9/44
USPC .. 707/747, 755, 759, 999.104, 104; 718/100
See application file for complete search history.

(56) References Cited

U.S. PATENT DOCUMENTS

| | | |
|---|---|---|
| 6,704,747 B1 * | 3/2004 | Fong |
| 2012/0136824 A1 * | 5/2012 | Williamson ........... G06Q 99/00 707/603 |
| 2012/0185859 A1 * | 7/2012 | Kashiwaya et al. .......... 718/100 |

* cited by examiner

*Primary Examiner* — James Trujillo
*Assistant Examiner* — John J Morris
(74) *Attorney, Agent, or Firm* — MH2 Technology Law Group LLP

(57) ABSTRACT

The present invention generally relates to systems and methods for executing scripts (a sequence of declarative operations) on large data sets. Some implementations store descriptions of previously-executed operations and associated input and output data sets. When executing similar operations on the same, a subset of, a superset of, or any fragment of data subsequently, some implementations detect duplication of operations and access previously-stored output data sets in order to re-use data and reduce the amount of execution, thus avoiding time-consuming duplicative computations.

18 Claims, 5 Drawing Sheets

```
-- operation1: load input file into myinput as character array
input = LOAD '/tmp/input.txt' USING TextLoader() AS
(myword:chararray);

-- operation2: extract words from each line and put them into a pig bag data
type,
-- then flatten the bag to get one word on each row
words = FOREACH input GENERATE FLATTEN (TOKENIZE
(myword)) AS singleword;

-- operation3: create a group for each word
grouped = GROUP words BY singleword;

-- operation4: count the entries in each group
counts = FOREACH grouped GENERATE group, COUNT(words);

-- operation5: store the counts into output file
STORE counts INTO '/tmp/output.txt' USING PigStorage();
```

FIG. 3

```
-- operation1: load input file into myinput as character array
myinput = LOAD '/tmp/input.txt' USING TextLoader() AS
(myword:chararray);

-- operation2: extract words from each line and put them into a pig bag data
type,
-- then flatten the bag to get one word on each row
mywords = FOREACH myinput GENERATE FLATTEN (TOKENIZE
(myword)) AS singleword;

-- operation3: create a group for each word
mygrouped = GROUP mywords BY singleword;

-- operation4: count the entries in each group
mycounts = FOREACH mygrouped GENERATE group, COUNT(words)
AS count;

-- operation5: filter counts
myfilters = FILTER mycounts BY count > 3;

-- operation6: store the counts into output file
STORE myfilters INTO '/tmp/output.txt' USING PigStorage();
```

FIG. 5

SYSTEMS AND METHODS FOR MANAGING DUPLICATION OF OPERATIONS

FIELD OF THE INVENTION

This invention relates generally to processing large amounts of data.

BACKGROUND OF THE INVENTION

Shared large data sources, e.g., on a cloud, can be subject to various operations being applied repeatedly on them for different purposes. Sometimes, regenerating results for certain operations on large data is more costly than storing them for later retrieval in terms of time and storage costs. Existing systems can support one-off runs of analytics on data. In such systems, data reuse must be manually determined by a user, and it is difficult to accomplish data re-use between multiple users.

SUMMARY

According to an embodiment, a system for, and method of, executing a script comprising one or more operations is disclosed. The method includes, and the system performs, parsing each of a plurality of operations into an operation name and an associated input data set description to obtain one or more parsed operation descriptions, determining, using a selected parsed operation description corresponding to a selected operation, that the selected operation has previously been executed on an associated previous execution input data set, linking an output of the selected operation to a stored output of the selected operation previously executed on an associated previous execution input data set to produce a revised script, and executing the revised script.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3 depicts an example script according to some embodiments;

FIG. 5 depicts an example script according to some embodiments

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
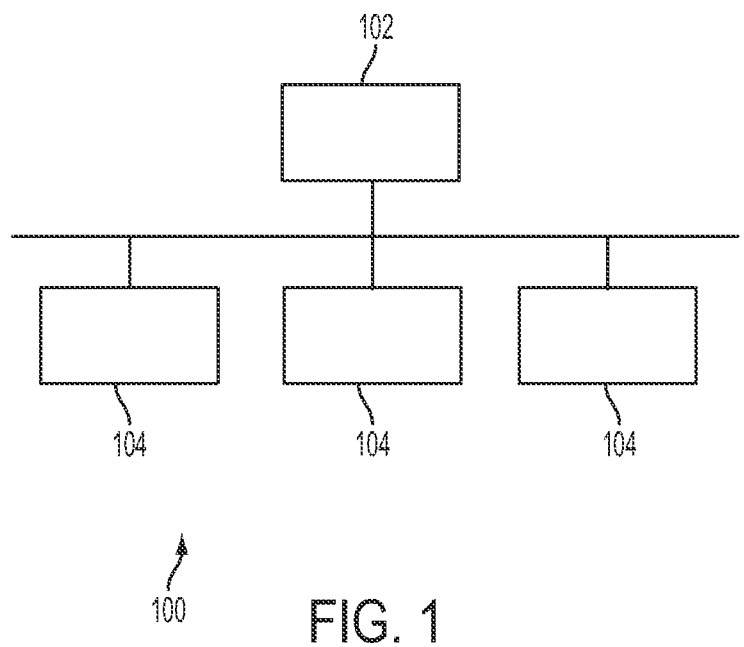
FIG. 1 is a schematic diagram of a system that is amenable to utilizing some embodiments.

FIG. 1 is a schematic diagram of a system that is amenable to implementing some embodiments. In particular, FIG. 1 depicts a system 100 capable of storing large-scale distributed data. System 100 includes client 102 and data nodes 104. System 102 can be set up using, e.g., the APACHE HADOOP software framework. Other set ups are also contemplated. Each of client 102 and data nodes 104 can include a computer. Data nodes 104 can be arranged in a cluster, in multiple co-located racks, or in multiple racks located in different locations, for example. Although three data nodes 104 are depicted, systems with more or fewer are also contemplated. The methods and systems disclosed herein can be practiced to efficiently process data in large-scale systems such as that depicted in FIG. 1.

Figure 2:
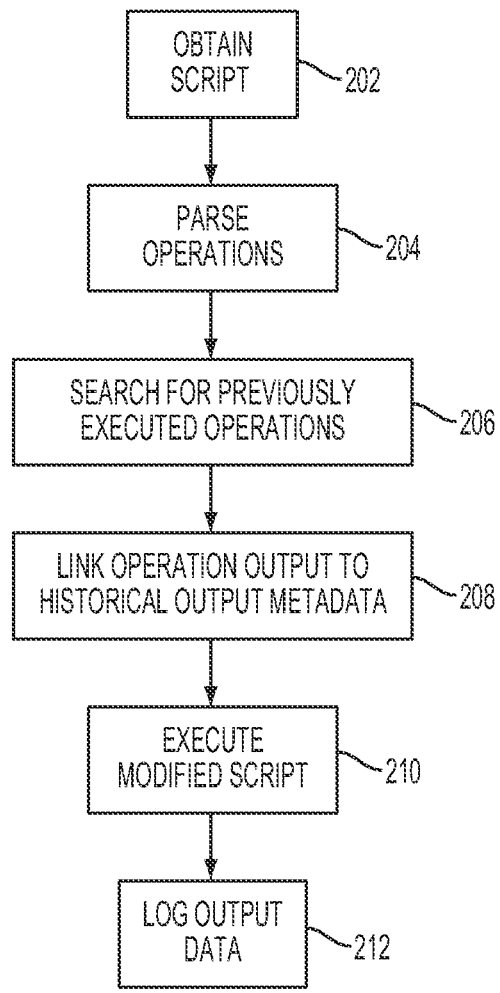
FIG. 2 is a flow chart of a method according to some embodiments.

FIG. 2 is a flow chart of a method according to some embodiments. The method described in relation to FIG. 2 may be implemented using, e.g., the system described in relation to FIG. 1.

At block 202, the system obtains a script. As used here, a script is a sequence of operations in a particular programming language, that is, a declarative operation procedure. The system may obtain the script by accessing it in memory storage, for example. Alternately, or in addition, the system may obtain the script over a network.

At block 204, the system parses the operations in the script. In general, each operation has associated input data. The input data for one operation may be supplied all or in part from another operation; that is, each operation can be considered a workflow. The system may parse a particular operation as follows.

$$\text{declarative operation} \rightarrow \text{<analytics operation, input metadata, hashing index(es)>} \quad (1)$$

In Formula (1), the declarative operation is parsed into the tuple on the right-hand side of the arrow. The tuple includes in its first field a syntactic representation of the analytics operation, e.g., its name.

The second field in the tuple includes a pointer to input metadata to be acted upon by the operation. The input metadata can be decomposed out into multiple levels of data if the analytics operation can act on each such level. In some implementations, the input metadata is decomposed out into each level that can be operated on. In some implementations, the input data is decomposed out into the main input level and then into as fine a granularity as is possible, i.e., a plurality of elemental portions. In some implementations, the input data is decomposed into both fine levels of granularity and intermediate levels of granularity.

For example, an analytics operation such as text analysis can be applicable to files, a column in a table, or a range of rows within a column in a table. If the input data is a file, then the input metadata can be represented as, for example, </your/path/file>. For a column within a table, the input metadata can be represented as, for example, <T:C>.

As another example decomposition, consider an operation applicable to any cell, row, or column in a table. An example such operation is word count. Consider input data consisting of two cells in table T, where the first cell is in column $C_1$, row $R_1$, and the second cell is in column $C_2$, row $R_2$. Then, the decomposed input metadata can be represented as, for example, the following tuples of metadata: <T:C1>, <T:C2>, <T:R1>, <T:R2>, <T:C1:R1>, and <T:C2:R2>. In general, decomposed input metadata can be represented as:

input metadata=<description level 1:description level 2: . . . :description level n>   (2)

The metadata representation of Formula (2) occupies the second field in the operation parsing schematic of Formula (1).

The third field in Formula (1) is occupied by hashing indexes, one for each input data metadata tuple. Thus, for each input data metadata tuple in the second field of Formula (1), the third field in Formula (1) includes a hash of the pair consisting of the operation name and the input data metadata tuple. The hash function can be any appropriate hash function that can serve to index and locate the stored operation and input data. That is, the hash function is used to find the pair of operation name and input metadata.

Thus, at the conclusion of block 204, each operation in the script has been parsed, e.g., in accordance with Formula (1).

At block 206, the system searches for previously executed operations. That is, for each operation in the script, the system uses the hashes computed at block 204 to determine whether the system previously performed the operation on the input metadata, any superset of input metadata, any subset of input metadata, or any portion data that overlaps any portion of the input data. The system can do so by using the hashes as indexes and determining whether corresponding output data is so indexed. If so, the system obtains the output metadata corresponding to the largest set of input metadata. The form of the stored output metadata is discussed in detail below in reference to block 212.

At block 208, the system links the output for each operation for which output metadata exists to historical output data. If an operation has multiple input metadata because it is decomposed into multiple individual portions, then each input metadata portion can be searched from historical usages and linked to existing corresponding output data. Then, as discussed below in reference to block 210, the operation may be performed on just the remaining set of input data.

At block 210, the system executes the modified script. This has the effect of reducing the number of declarative operations and/or the amount of data to which to apply the declarative operation. For example, consider a script that consists of three operations: op1, op2, and op3. If a historical usage for op1 with the same, or any portion of, input metadata exists as determined at block 206, then at block 208, the output for op1 is linked to the output metadata found from historical usages. Because of the duplication of operation, op1 does not need to be executed, or is executed on the remaining subset of input data. If the entire input metadata is found from historical usages, then the output of op1 is the entire input of op2, and the script can be reduced to just op2 and op3. If the found output of op1 is part, i.e., a proper subset, of the input of op2, and if op1 still needs to be executed on the remaining subset of input data for which output data does not exist in historical usages, then op1 in the script can be rewritten such that op1 executes on a reduced input data set and links to the existing output data.

At block 212, the system logs output data for each operation. More particularly, the system logs output data for each operation that has not previously been performed. The format of each log entry can be, for example:

historical usage=<analytics operation, input metadata, hashing index(es), output metadata>   (3)

In Formula (3), the format of the first three fields are the same as the first three fields of Formula (1). The format for the fourth field is similar to that of Formula (2). For example, the output metadata can be represented as:

output metadata=<description level 1:description level 2: . . . :description level n>   (4)

The system can log the historical usage metadata in persistent memory, e.g., hard disk drives, for later retrieval using the hash indexes. Such metadata can then be used in subsequent executions of identical, similar, or different scripts.

Note that in some implementations, the hash indexes are omitted. In such implementations, the input metadata strings are compared directly with historical metadata strings in order to obtain previously computed output data.

Figure 4:
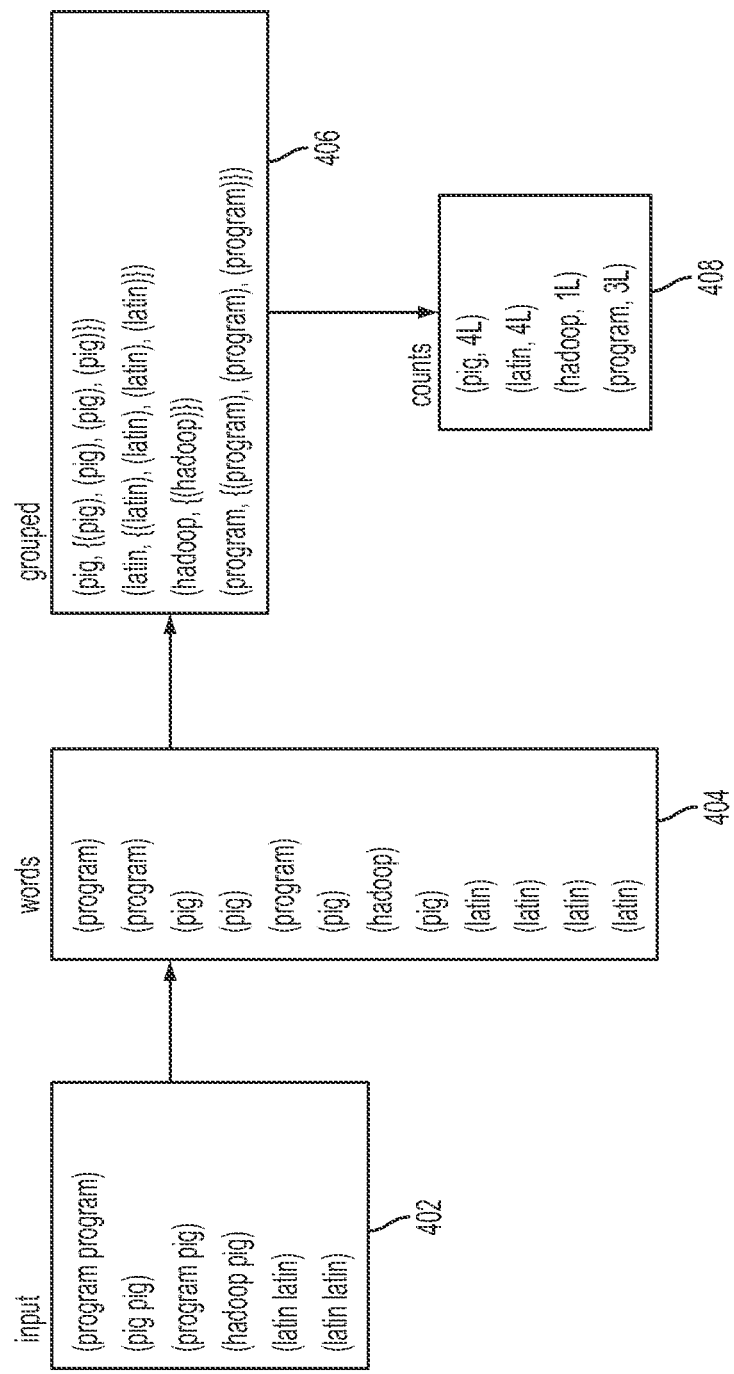
FIG. 4 is a schematic diagram of data processing according to the script of FIG. 3.

FIGS. 3-5 collectively illustrate an example implementation of the technique described above in reference to FIG. 2.

FIG. 3 depicts an example script according to some embodiments. In particular, FIG. 3 depicts an example script written in the PIG Latin programming language, which can be used to process large data sets using, e.g., Hadoop MapReduce. The script of FIG. 3 may be obtained according to block 202 of FIG. 2. The script depicted in FIG. 3 produces a word count of the data set "input.txt".

FIG. 4 is a schematic diagram of data processing according to the script of FIG. 3. Thus, block 402 represents input data in the file "input.txt" loaded according to operation 1. According to operation 2, each word is extracted from each line and put into a PIG bag data type, represented by block 404. According to operation 3, the script creates a group for each word, depicted in FIG. 4 at block 406. Next, operation 4 counts the entries in each group, as depicted in block 406. These counts are stored in accordance with operation 5 of the script depicted in FIG. 3.

FIG. 5 depicts an example script according to some embodiments. In particular, the script of FIG. 5 is similar to that of FIG. 4, except it includes an additional step of filtering out words whose count is less than four. Thus, operation 1 through operation 4 are identical to those of the script depicted in FIG. 3. Operation 5 then filters out words with counts greater than three. Operation 6 stores the result in a file denoted "output.txt".

To further illustrate the method of FIG. 2, consider, for example, executing the script of FIG. 3 according to an embodiment of the present invention. Assume, for the purposes of illustration, that no operation in the script of FIG. 3 has been previously executed by the associated system. Thus, the operations of the script of FIG. 3 are parsed (block 204 of FIG. 2), and the system searches for previously-executed operations (block 206 of FIG. 2). Because none of the operations have been previously executed in this example, no linking per block 208 of FIG. 2 occurs, and the script executes unmodified per block 210 of FIG. 2.

However, at block 212, the system logs output data. This step need not be performed on operation 1, nor operation 5, because LOAD and STORE do not have operational results. The following Table 1 provides example log records for operation 2, operation 3, and operation 4 of the script of FIG. 3.

TABLE 1

<FLATTEN, '/tmp/input.txt', 1, '/tmp/result/input-flatten.txt'>
<GROUP, '/tmp/result/input-flatten.txt', 2, '/tmp/result/input-flatten-group.txt'>
<COUNT, '/tmp/result/input-flatten-group.txt', 3, '/tmp/result/input-flatten-group-count.txt'>

Note that the log entries of the Table 1 are formed according to Formula (3), and the hash indexes are simulated for purposes of illustration.

Continuing to illustrate the method of FIG. 2 using FIGS. 3-5, now consider executing the script of FIG. 5 in the same system that previously executed the script of FIG. 3. Note that the script of FIG. 3 and the script of FIG. 5 both include several common operations. When executing the script of FIG. 5, the system parses operation2 into <FLATTEN, '/tmp/input.txt', 1> and searches log records for historical usages. The hashing index is generated based on operation name and input data, hence, the system identifies existing historical usage, <FLATTEN, '/tmp/input.txt', 1, '/tmp/result/input-flatten.txt'> using the hashing indexes. The existing historical usage thus identifies the location of the output data. Next, the system disables operation2, and the input of operation3 is set to '/tmp/result/input-flatten.txt'. Similarly, operation 3 and operation 4 are detected from historical usages and linked. The final execution plan of the script of FIG. 5 is schematically depicted below in Table 2.

TABLE 2 mycounts = LOAD '/tmp/result/input-flatten-group-count.txt' USING TextLoader( );
myfilters = FILTER mycounts BY count > 3;
→ <FILTER, '/tmp/result/input-flatten-group-count-filter.txt', 5>
STORE myfilters INTO '/tmp/output.txt' USING PigStorage( );

Note that in Table 2, operation2, operation3, and operation4 are replaced with a link to historical data as discussed in detail herein.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer implemented method of executing a script comprising one or more operations, the method comprising:
   parsing each of a plurality of operations into an operation name and an associated input data set description to obtain one or more parsed operation descriptions;
   determining, using a selected parsed operation description corresponding to a selected operation, that the selected operation has previously been executed on an associated previous execution input data set, wherein the associated previous execution input data set is a proper subset of at least one associated input data set for the selected operation;
   reducing the at least one associated input data set based on an overlap between the associated previous execution input data set and the at least one associated input data set, thereby producing a reduced input data set that includes a portion of the at least one associated input data set and excludes the overlap;
   linking an output of the selected operation to a stored output of the selected operation previously executed on the associated previous execution input data set and an execution output of the selected operation executed on the reduced input data set, thereby producing a revised script; and
   executing the revised script.

2. The method of claim 1, wherein the determining comprises calculating a hash of the selected parsed operation description.

3. The method of claim 1, wherein the determining comprises matching the selected parsed operation description to a stored parsed operation description.

4. The method of claim 1, wherein the parsing comprises providing at least one associated input data set description that comprises a description of a decomposition of the at least one associated input data set.

5. The method of claim 4, wherein the description of the at least one associated input data set comprises a description of the at least one associated input data set in entirety and a description of the proper subset of the at least one associated input data set.

6. The method of claim 5, wherein the description of the at least one associated input data set further comprises a description of an elemental portion of the at least one associated input data set.

7. The method of claim 1, further comprising logging at least one operation name of the selected operation, at least one associated input data set description for the selected operation, and at least one associated output data set description for the selected operation.

8. The method of claim 7, wherein the at least one input data set description comprises a decomposition.

9. The method of claim 7, wherein the at least one output data set description comprises a decomposition.

10. A system for executing a script comprising one or more operations, the system comprising:
    a memory, storing a set of instructions; and
    at least one processor that executes the stored set of instructions to:
    parse each of a plurality of operations into an operation name and an associated input data set description to obtain one or more parsed operation descriptions;

determine, using a selected parsed operation description corresponding to a selected operation, that the selected operation has previously been executed on an associated previous execution input data set, wherein the associated previous execution input data set is a proper subset of at least one associated input data set for the selected operation;

reduce the at least one associated input data set based on an overlap between the associated previous execution input data set and the at least one associated input data set, thereby producing a reduced input data set that includes a portion of the at least one associated input data set and excludes the overlap;

link an output of the selected operation to a stored output of the selected operation previously executed on the associated previous execution input data set and an execution output of the selected operation executed on the reduced input data set, thereby producing a revised script; and execute the revised script.

11. The system of claim 10, wherein the at least one processor further calculates a hash of the selected parsed operation description.

12. The system of claim 10, wherein the at least one processor further matches the selected parsed operation description to a stored parsed operation description.

13. The system of claim 10, wherein the at least one processor further provides at least one associated input data set description that comprises a description of a decomposition of the at least one associated input data set.

14. The system of claim 13, wherein the description of the at least one associated input data set comprises a description of the at least one associated input data set in entirety and a description of the proper subset of the at least one associated input data set.

15. The system of claim 14, wherein the description of the at least one associated input data set further comprises a description of an elemental portion of the at least one associated input data set.

16. The system of claim 10, wherein the at least one processor further logs at least one operation name of the selected operation, at least one associated input data set description for the selected operation, and at least one associated output data set description for the selected operation.

17. The system of claim 16, wherein the at least one input data set description comprises a decomposition.

18. The system of claim 16, wherein the at least one output data set description comprises a decomposition.

* * * * *